US009529510B2

(12) United States Patent
Sutton et al.

(10) Patent No.: US 9,529,510 B2
(45) Date of Patent: Dec. 27, 2016

(54) DETERMINATION OF SHARE VIDEO INFORMATION

(71) Applicant: HERE Global B.V., LB Veldhoven (NL)

(72) Inventors: Charlie Sutton, San Francisco, CA (US); Brody Larson, San Mateo, CA (US); Sebastian Frey, Woodland Hills, CA (US); Pascal Wever, Los Angeles, CA (US); David Vegezzi, Santa Monica, CA (US)

(73) Assignee: HERE Global B.V., Eindhoven (NL)

( * ) Notice: Subject to any disclaimer, the term of this patent is extended or adjusted under 35 U.S.C. 154(b) by 162 days.

(21) Appl. No.: 14/201,748

(22) Filed: Mar. 7, 2014

(65) Prior Publication Data
US 2015/0253961 A1 Sep. 10, 2015

(51) Int. Cl.
| | |
|---|---|
| *G06F 3/0484* | (2013.01) |
| *G11B 27/034* | (2006.01) |
| *H04L 29/08* | (2006.01) |
| *G11B 27/32* | (2006.01) |
| *G11B 27/34* | (2006.01) |
| *G06F 3/0485* | (2013.01) |
| *G06F 3/0488* | (2013.01) |

(52) U.S. Cl.
CPC ......... *G06F 3/04842* (2013.01); *G11B 27/034* (2013.01); *G11B 27/322* (2013.01); *G11B 27/34* (2013.01); *H04L 67/104* (2013.01); *G06F 3/0485* (2013.01); *G06F 3/04883* (2013.01)

(58) Field of Classification Search
CPC .......................... G06F 3/04842; G06F 3/0485; G06F 3/04883; G11B 27/034; G11B 27/322; G11B 27/34; H04L 67/104
See application file for complete search history.

(56) References Cited

U.S. PATENT DOCUMENTS

| | | | |
|---|---|---|---|
| 6,160,548 A | 12/2000 | Lea et al. | |
| 8,723,914 B2 * | 5/2014 | Mackie | ..................... H04N 7/15 348/14.07 |
| 8,880,051 B2 * | 11/2014 | Ghosh | ..................... H04L 29/08 455/41.2 |

(Continued)

OTHER PUBLICATIONS

International Search Report and Written Opinion received for corresponding Patent Cooperation Treaty Application No. PCT/EP2015/054134, dated May 29, 2015, 12 pages.

(Continued)

*Primary Examiner* — Maryam Ipakchi
(74) *Attorney, Agent, or Firm* — Lempia Summerfield Katz LLC

(57) ABSTRACT

A method comprising causing display of at least one frame of video information, receiving information indicative of a scrub input associated with the video information, such that the scrub input comprises a movement portion and a termination portion, causing display of a progression of frames of the video information in correspondence with the movement portion of the scrub input determining share video information that comprises at least part of the video information based, at least in part, on a speed of the movement portion of the scrub input, and sending the share video information to a separate apparatus is disclosed.

19 Claims, 9 Drawing Sheets

(56) References Cited

U.S. PATENT DOCUMENTS

| | | | | |
|---|---|---|---|---|
| 2007/0098357 | A1* | 5/2007 | McEnroe | H04N 5/76 386/343 |
| 2007/0146347 | A1* | 6/2007 | Rosenberg | G06F 3/04883 345/173 |
| 2008/0084400 | A1* | 4/2008 | Rosenberg | G06F 1/1626 345/173 |
| 2008/0155413 | A1 | 6/2008 | Ubillos | |
| 2009/0019476 | A1* | 1/2009 | Ohlfs | H04N 5/783 725/38 |
| 2009/0079840 | A1 | 3/2009 | Gandhi et al. | |
| 2010/0156812 | A1* | 6/2010 | Stallings | G06F 3/04883 345/173 |
| 2011/0035700 | A1* | 2/2011 | Meaney | G06F 3/048 715/784 |
| 2011/0065459 | A1* | 3/2011 | Cheng | H04W 4/023 455/457 |
| 2011/0083111 | A1* | 4/2011 | Forutanpour | G06F 1/1694 715/863 |
| 2011/0199318 | A1* | 8/2011 | Fong | G06F 3/0485 345/173 |
| 2011/0276881 | A1 | 11/2011 | Keng et al. | |
| 2011/0292229 | A1 | 12/2011 | Deever | |
| 2012/0030566 | A1* | 2/2012 | Victor | G06F 3/0482 715/702 |
| 2012/0030632 | A1* | 2/2012 | McRae | G06F 3/017 715/863 |
| 2012/0050012 | A1* | 3/2012 | Alsina | H04N 21/4126 340/10.1 |
| 2012/0054612 | A1* | 3/2012 | Bok | G06F 3/0488 715/716 |
| 2012/0054619 | A1 | 3/2012 | Spooner et al. | |
| 2012/0062604 | A1* | 3/2012 | Lobo | G06F 3/0485 345/684 |
| 2012/0096357 | A1* | 4/2012 | Folgner | G11B 27/34 715/726 |
| 2012/0131458 | A1* | 5/2012 | Hayes | H04N 21/41407 715/716 |
| 2012/0179967 | A1* | 7/2012 | Hayes | G06F 3/0485 715/719 |
| 2012/0235938 | A1* | 9/2012 | Laubach | G06F 3/0416 345/173 |
| 2013/0111579 | A1* | 5/2013 | Newman | G06F 3/0488 726/17 |
| 2013/0125016 | A1* | 5/2013 | Pallakoff | G06F 3/04817 715/748 |
| 2013/0129308 | A1* | 5/2013 | Karn | H04N 5/772 386/230 |
| 2013/0132462 | A1* | 5/2013 | Moorer | H04N 21/2343 709/203 |
| 2013/0145267 | A1* | 6/2013 | Ramachandran | G06F 3/04842 715/719 |
| 2013/0257770 | A1* | 10/2013 | Tsaregorodtsev | G06F 3/0488 345/173 |
| 2013/0307792 | A1* | 11/2013 | Andres | G11B 27/005 345/173 |
| 2014/0281996 | A1* | 9/2014 | Paulraj | G06F 3/0484 715/720 |
| 2014/0282001 | A1* | 9/2014 | Lau | G06F 3/0488 715/723 |
| 2014/0355961 | A1* | 12/2014 | Paulus | G11B 27/10 386/282 |
| 2014/0359497 | A1* | 12/2014 | Lee | G06F 3/0488 715/764 |
| 2014/0380158 | A1* | 12/2014 | Kapahi | G06F 3/0481 715/711 |
| 2015/0058733 | A1* | 2/2015 | Novikoff | G11B 27/031 715/723 |
| 2015/0106712 | A1* | 4/2015 | Oh | G11B 27/034 715/716 |

OTHER PUBLICATIONS

"PicFromVid", Retrieved on Mar. 10, 2014, Webpage available at: http://www.picfromvid.com/.

Yamaashi et al., "User-Centered Video: Transmitting Video Images Based on the User's Interest", Proceedings of the SIGCHI Conference on Human Factors in Computing Systems, May 7-11, 1995, pp. 325-330.

Swartz, "Turn video into single-frame images with StillShot", Appolicious, Retrieved on Mar. 13, 2014, Webpage available at: http://www.appolicious.com/articles/12063-turn-video-into-single-frame-images-with-stillshot.

"Videopix-IPhone's First Video Frame Capture App", retrieved on May 19, 2014, Webpage available at: http://www.seeitwithus.com/videopix.htm.

Meadows, Larry, "Taking Photos with HTC Zoe", HTC Blog, retreived on May 19, 2014, webpage available at http://blog.htc.com/2013/03/htc-one-zoe-camera/.

\* cited by examiner

DETERMINATION OF SHARE VIDEO INFORMATION

TECHNICAL FIELD

The present application relates generally to determination of share video information.

BACKGROUND

As electronic apparatuses become increasingly prevalent in our society, many users have become increasingly dependent on their electronic apparatus in daily life. For example, a user may desire to share video content by way of the user's electronic apparatus. As such, it may be desirable to configure an electronic apparatus such that a user of the electronic apparatus may share such video content in an intuitive manner.

SUMMARY

Various aspects of examples of the invention are set out in the claims.

One or more embodiments may provide an apparatus, a computer readable medium, a non-transitory computer readable medium, a computer program product, and a method for causing display of at least one frame of video information, receiving information indicative of a scrub input associated with the video information, such that the scrub input comprises a movement portion and a termination portion, causing display of a progression of frames of the video information in correspondence with the movement portion of the scrub input determining share video information that comprises at least part of the video information based, at least in part, on a speed of the movement portion of the scrub input, and sending the share video information to a separate apparatus.

One or more embodiments may provide an apparatus, a computer readable medium, a computer program product, and a non-transitory computer readable medium having means for causing display of at least one frame of video information, means for receiving information indicative of a scrub input associated with the video information, such that the scrub input comprises a movement portion and a termination portion, means for causing display of a progression of frames of the video information in correspondence with the movement portion of the scrub input determining share video information that comprises at least part of the video information based, at least in part, on a speed of the movement portion of the scrub input, and means for sending the share video information to a separate apparatus.

In at least one example embodiment, the scrub input is associated with the video information by way of at least a portion of the scrub input corresponding with a video timeline indicator of the video information.

In at least one example embodiment, the scrub input is associated with the video information by way of at least a portion of the scrub input corresponding with the progression of frames of the video information.

In at least one example embodiment, the share video information comprises at least part of the video information that is designated to be sent to the separate apparatus.

One or more example embodiments further perform determination that the speed of the movement portion of the scrub input is less than a frame skipping speed threshold, wherein the progression of the frames of the video information is a contiguous progression of adjacent frames of the video information based, at least in part, on the determination that the speed of the movement portion of the scrub input is less than the frame skipping speed threshold, and determination of the share video information comprises determining the share video information to be an image that represents a frame that is displayed during the termination portion of the scrub input based, at least in part, on the determination that the speed of the movement portion of the scrub input is less than the frame skipping speed threshold.

In at least one example embodiment, a frame skipping speed threshold is a speed of a scrub input that signifies a difference between a range of speeds associated with a contiguous progression of adjacent frames of the video information, and a different range of speeds associated with a contiguous progression of non-adjacent frames of the video information.

In at least one example embodiment, a speed of a scrub input that is less than the frame skipping speed threshold is associated with a contiguous progression of adjacent frames of video information.

In at least one example embodiment, a speed of a scrub input that is greater than to the frame skipping speed threshold is associated with a contiguous progression of non-adjacent frames of video information.

One or more example embodiments further perform determination that the speed of the movement portion of the scrub input is greater than a frame skipping speed threshold, wherein the progression of the frames of the video information is a contiguous progression of non-adjacent frames of the video information based, at least in part, on the determination that the speed of the movement portion of the scrub input is greater than the frame skipping speed threshold, and determination of the share video information comprises determining the share video information to comprise an entirety of the video information based, at least in part, on the determination that the speed of the movement portion of the scrub input is greater than the frame skipping speed threshold.

One or more example embodiments further perform identification of a displayed frame, the displayed frame being a frame that is displayed during the termination portion of the scrub input.

One or more example embodiments further perform determination of an image that represents the displayed frame, wherein determining the share video information comprises associating the image with the share video information such that the image is a video thumbnail of the share video information.

In at least one example embodiment, the association of the image with the share video information comprises causation of metadata of the shared video information to indicate the image as the video thumbnail of the shared video information.

In at least one example embodiment, determining the share video information comprises designation of the displayed frame as a first observed frame of the share video information.

One or more example embodiments further perform receipt of information indicative of a trim operation selection input, determination that the speed of the movement portion of the scrub input is greater than a frame skipping speed threshold, identification of a displayed frame, the displayed frame being a frame that is displayed during the termination portion of the scrub input, and determination of a video segment that is a portion of the video information that corresponds with at least one of a portion of the video information prior to the displayed frame or a portion of the video information subsequent to the displayed frame, wherein determining the share video information comprises determining the share video information to be the video segment based, at least in part, on the determination that the movement portion of the scrub input is greater than the frame skipping speed threshold and the trim operation selection input.

In at least one example embodiment, the trim operation selection input signifies that a subsequent scrub input indicates at least one of a start frame or an end frame of the video segment.

One or more example embodiments further perform receipt of information indicative of a share input, wherein the sending the share video information to the separate apparatus is based, at least in part, on the share input.

One or more example embodiments further perform causation of display of a share video information indicator that indicates the part of the video information comprised by the share video information.

In at least one example embodiment, the share video information indicator is an entirety share video information indicator.

In at least one example embodiment, the entirety share video information indicator signifies that the share video information corresponds with an entirety of the video information.

In at least one example embodiment, the share video information indicator is a frame share video information indicator.

In at least one example embodiment, the frame share video information indicator signifies a frame of the video information that corresponds with the share video information, such that the share video information is an image that represents the frame of the video information.

In at least one example embodiment, the share video information is a video segment and the share video information indicator comprises at least one of a segment start indicator or a segment end indicator.

In at least one example embodiment, the segment start indicator signifies a frame of the video information that corresponds with a start frame of the video segment.

In at least one example embodiment, the segment end indicator signifies a frame of the video information that corresponds with an end frame of the video segment.

One or more example embodiments further perform causation of display of a video thumbnail indicator that signifies a frame of the video information that corresponds with a video thumbnail of the share video information.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
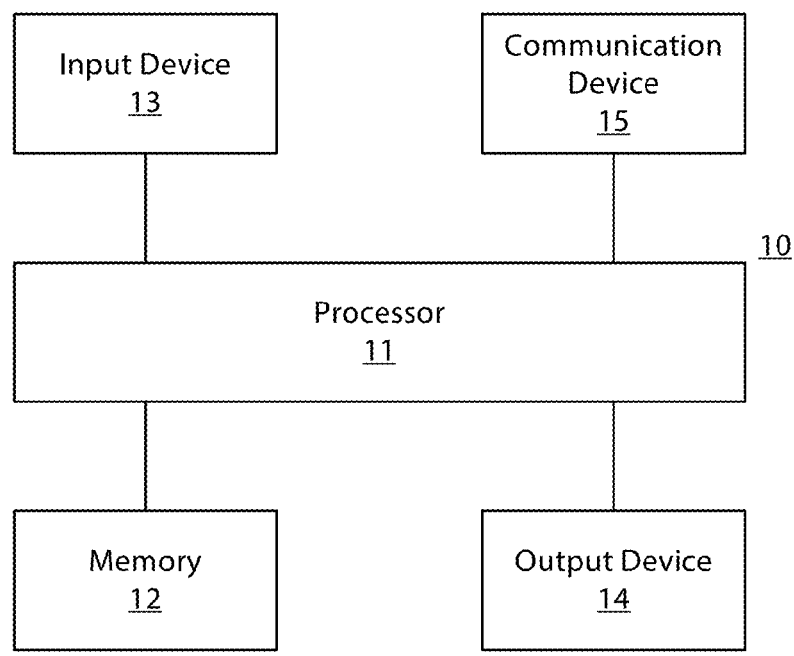
FIG. 1 is a block diagram showing an apparatus according to at least one example embodiment.

An embodiment of the invention and its potential advantages are understood by referring to FIGS. 1 through 9 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
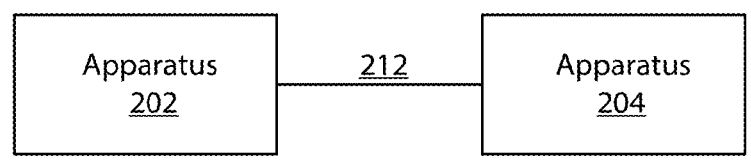
FIG. 2 is a block diagram showing apparatus communication according to at least one example embodiment.

FIG. 2 is a block diagram showing apparatus communication according to at least one example embodiment. The example of FIG. 2 is merely an example and does not limit the scope of the claims. For example, apparatus count may vary, apparatus configuration may vary, communication channels may vary, and/or the like.

In many circumstances, a user may desire to experience media by way of an electronic apparatus. For example, the user may desire to view an image, watch a video, browse through a set of images, experience an image slideshow, and/or the like. In many circumstances, the user may desire to engage in social interactions by way of the user's electronic apparatus. In order to facilitate such an experience, in many circumstances, it may be desirable to allow for communication between two or more apparatuses. For example, it may be desirable to allow for communication between an apparatus and a separate apparatus. In such an example, each of the apparatus and the separate apparatus may be a phone, a tablet, a computer, a laptop, an electronic apparatus, a server, and/or the like. In at least one example embodiment, an apparatus and a separate apparatus communicate via a direct communication channel, an indirect communication channel, and/or the like. In such an example embodiment, the indirect communication channel may route communication between the apparatus and the separate apparatus by way of one or more routers, switches, hubs, distribution servers, and/or the like. In at least one example embodiment, an apparatus and a separate apparatus communicate via an indirect communication channel by way of a server. In such an example embodiment, the server may be a computer, a service platform, a repository, an application, and/or the like. For example, the server, may be configured to update an account associated with the separate apparatus such that the separate apparatus may receive information from the apparatus by way of accessing the account via the server.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus. In some circumstances, a plurality of apparatuses may collaborate by way of local communication among the apparatuses. For example, the apparatuses may collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like. In some circumstances, apparatuses may collaborate by way of non-local communication among the apparatuses. For example, the apparatuses may communicate by way of high power radio frequency communication, wide area network communication, internet communication, cellular network communication, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform.

In at least one example embodiment, an apparatus and a separate apparatus communicate by way of communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like.

Figure 3A:
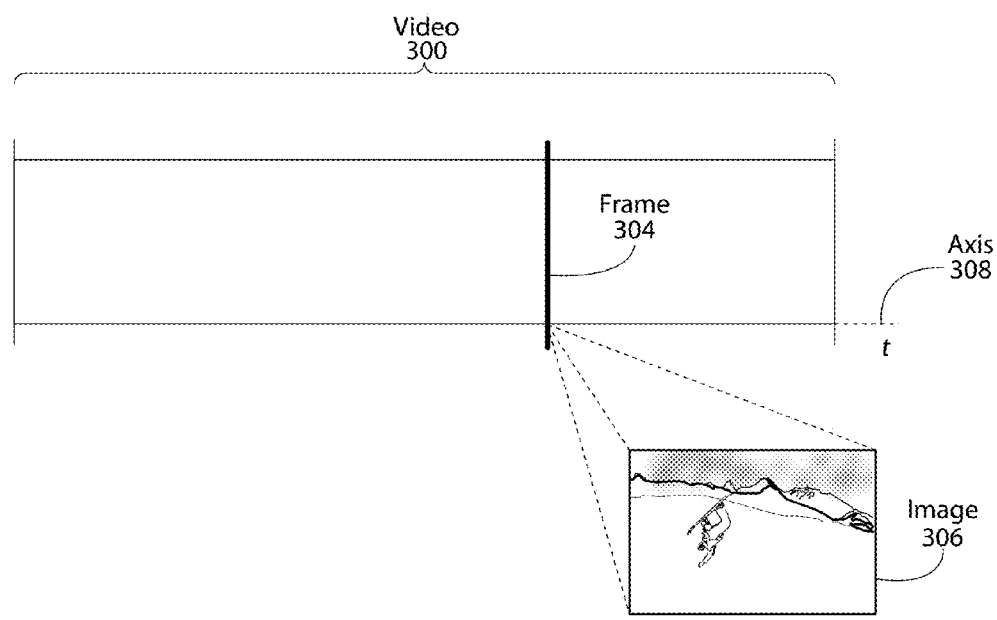
FIGS. 3A-3B are diagrams illustrating a video and a video segment according to at least one example embodiment.
Figure 3B:
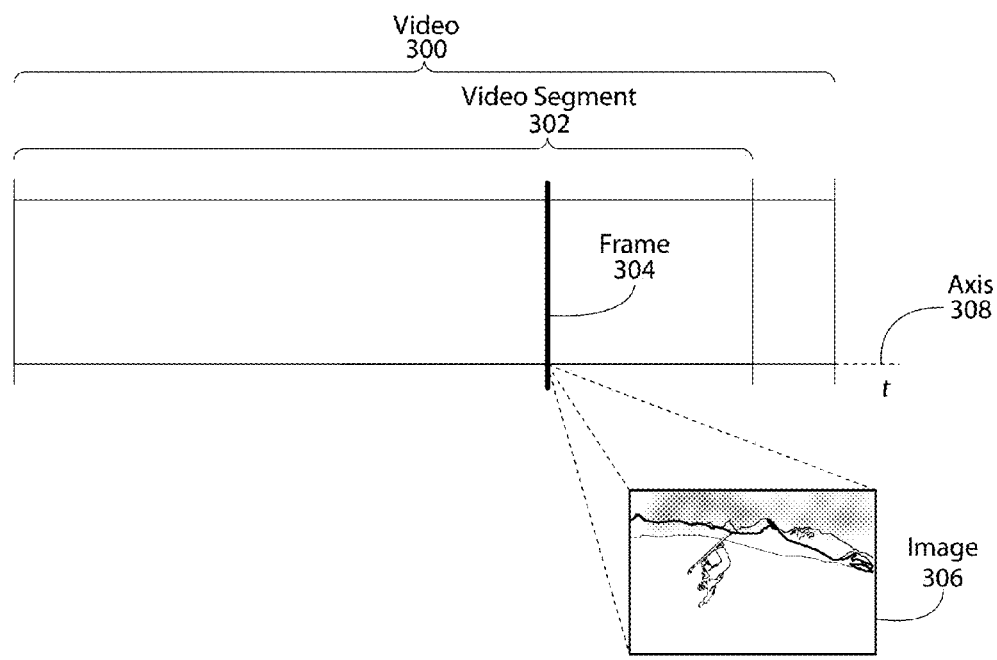

FIGS. 3A-3B are diagrams illustrating a video and a video segment according to at least one example embodiment. The examples of FIGS. 3A-3B are merely examples and do not limit the scope of the claims. For example, video configuration may vary, video segment configuration may vary, frame position may vary, and/or the like.

In many circumstances, a user of an electronic apparatus may desire to utilize her electronic apparatus in numerous and varied manners. For example, users increasingly utilize their electronic apparatuses for purposes relating to sharing of content with other users, viewing content shared by other users, capturing visual content for later viewing, and/or the like. For example, the user may desire to watch a video. A video may be a movie, a video clip, a motion image, an animated image, and/or the like. For example, the video may be a particular video file type, such as an audio video interleave file, an MPEG-4 video file, a MPEG video file, a windows media video file, and/or the like. A video may comprise video information. Video information may comprise a still image, a moving image, a portion of a still image, a portion of a moving image, a video, a portion of a video, a frame, and/or the like.

In many circumstances, a video may comprise less exciting portions, more exciting portions, and/or the like. In such circumstances, a user may desire to view the portion of the video that is more exciting, and to avoid viewing a portion of the video that is less exciting. In this manner, the user may desire to watch a portion of the video that is less than the entirety of the video in order to facilitate an exciting and interesting viewing experience for the user. As such, it may be desirable to configure an apparatus such that the apparatus may identify a particular portion of a video to display to the user. For example, the user may designate such a portion of the video by way of one or more inputs. In at least one example embodiment, an apparatus identifies a video segment comprised by a video that is less than an entirety of the video. In this manner, the video segment comprises a portion of the video information that is comprised by the video. In order to facilitate an exciting and interesting viewing experience, the identification of the video segment may be based, at least in part, on user input. For example, the video segment may be associated with a duration that spans 15 seconds prior to the end of the video, 15 seconds subsequent to midpoint beginning of the video, and/or the like. In this manner, the video segment may omit a portion of the video that is at the beginning of the video, at the end of the video, and/or the like.

Once a particular video segment of a video has been identified, it may be desirable for an electronic apparatus to cause storage of an indication of the video segment, of the video segment, and/or the like, such that a user of the electronic apparatus may subsequently watch the video segment. In at least one example embodiment, an apparatus causes storage of the video segment as a stored video segment. For example, the apparatus may cause storage of the video segment in a video segment repository, may store information indicative of the video segment in a database, and/or the like. In such an example, causation of storage of the video segment may comprise storage of the video segment in at least one memory comprised by the apparatus, sending of the video segment to a separate apparatus such that the separate apparatus stores the video segment, and/or the like.

In order to maintain a relational connection between the video and the video segment of the video, it may be desirable to establish an association between the video and the video segment. For example, information indicative of the association between the video and the video segment may be stored in a data base, in metadata associated with the video, in metadata associated with the video segment, and/or the like. In this manner, the apparatus may establish a relation association between the video and the video segment. For example, the identification of the video segment may comprise determination that a stored video segment is associated with the video. In such an example, the apparatus may retrieve information indicative of an association between the video and a particular video segment. In such an example, the apparatus may determine the video segment to be the stored video segment based, at least in part, on the information indicative of the association between the video and the stored video segment.

FIG. 3A is a diagram illustrating a video, a frame, and an image according to at least one example embodiment. The example of FIG. 3A depicts video 300 in relation to axis 308. In the example of FIG. 3A, axis 308 is a time axis. In this manner, the width of video 300 on axis 308 is indicative of a duration of video 300. The example of FIG. 3A illustrates frame 304 in relation to video 300 and axis 308. In the example of FIG. 3A, frame 304 designates a timestamp of video 300 as indicated by the position of frame 304 on axis 308. As can be seen, frame 304 is associated with image 306, which is comprised by video 300. In this manner, image 306 is an image that represents frame 304.

FIG. 3B is a diagram illustrating a video, a video segment, a frame, and an image to at least one example embodiment. As can be seen, video 300, and axis 308 of FIG. 3B correspond with video 300, and axis 308 of FIG. 3A. Video segment 302 is a portion of video 300 that is less than the entirety of video 300. As can be seen, the duration of video segment 302, as indicated by the width of video segment 302 on axis 308, is less than the duration of video 300. As such, video segment 302 is a portion of video 300 that is less than the entirety of video 300.

As discussed previously, in many circumstances, a user of an electronic apparatus may desire to watch a video, view a movie, watch a video segment, and/or the like. As such, it may be desirable to configure the electronic apparatus such that the electronic apparatus may render a video, render a video segment, display a video or video segment, and/or the like. In at least one example embodiment, rendering of a video or video segment comprises causation of display of the video or video segment on a display. The display may be comprised by the apparatus, by a separate apparatus, and/or the like. In this manner, the apparatus may display the video or video segment on a display comprised by the apparatus, may send the video or video segment to a separate apparatus such that the separate apparatus is caused to display the video or video segment, and/or the like.

In order to facilitate rendering of a video or video segment, displaying of the video or video segment, etc., it may be desirable to identify a particular frame associated with playback of the video or video segment. In at least one example embodiment, an apparatus identifies an image of a video or video segment such that the image of the video or video segment represents a displayed frame. The displayed frame may designate a part of a video to be rendered, a part of a video segment to be rendered, and/or the like. For example, the displayed frame may designate a timestamp of the video, such that identification of the image of the video segment comprises determination that the timestamp corresponds with the frame of the video segment. In this manner, the displayed frame may be indicative of a particular timestamp of the video, a particular image of the video, and/or the like. In at least one example embodiment, a displayed frame of the video is represented by an image. For example, the displayed frame may be a downscaled version of the image, an upscaled version of the image, may be an interlaced version of the image, and/or the like. In such an example, the apparatus may cause display of the image in a video rendering region. The video rendering region may be a portion of a display associated with rendering of a video, a video segment, an image, a displayed frame, and/or the like.

In many circumstances, a user may desire to fast forward through a portion of a video or a video segment, to jump back to a particular timestamp associated with a different video or video segment, and/or the like. In at least one example embodiment, an input that indicates a user intent to jump to a particular timestamp associated with a specific video or video segment is a scrub input. In at least one example embodiment, an apparatus receives information indicative a scrub input associated with the video rendering region. In at least one example embodiment, a scrub input is a drag input. In such an example embodiment, the drag input may comprise a contact portion of the drag input, a movement portion of the drag input, and a termination portion of the drag input. In such an example, the contact portion of the drag input may be at an input position that corresponds with, at least a portion of, the display region of the display. In this manner, the contact portion of the drag input that is at an input position that corresponds with, at least a portion of, the display region of the display is indicative of a scrub input associated with the video rendering region.

For example, a user may desire to indicate a frame by way of a scrub input associated with video information. In such an example, the user may desire to indicate a frame associated with a video. As such, the user may indicate such a desire by way of a drag input that scrubs to the rendering position in relation to a time axis and the video rendering region. For example, the drag input may comprise a contact portion of the drag input corresponds with the video rendering region, a movement portion of the drag input that moves in relation to the time axis, and a termination portion of the drag input corresponds with the video rendering region. In such an example, the contact portion of the drag input and the movement portion of the drag input may indicate scrubbing to a frame that is associated with a position of the termination portion of the drag input. In this manner, the termination portion of the drag input may be indicative of the user's desire to cause playback of the video segment from the timestamp designated by the frame, to designate a video segment that corresponds with the frame, to designate an image that represents the frame, and/or the like. When a user indicates a frame by way of a scrub input, it may be desirable to designate the frame as a start frame of a video segment, an end frame of a video segment, and/or the like. A start frame is a frame that corresponds with a first frame of a video segment. An end frame is a frame that corresponds with a final frame of a video segment. In this manner, playback may begin at a start frame of a video segment, may terminate at a final frame of a video segment, and/or the like.

FIGS. 4A-4D are diagrams illustrating determination of share video information according to at least one example embodiment. The examples of FIGS. 4A-4D are merely examples and do not limit the scope of the claims. For example, the video information may vary, the video length may vary, the video format may vary, and/or the like.

In many circumstances when displaying video information, it may be desirable for a user to easily identify a particular element of video information. For instance, when a user wishes to share a movie that comprises video information, a user may wish to locate a particular portion of the movie and share that portion. In such an example, the user may desire to share the portion of the movie absent video information that is beyond the portion of the movie. It may be desirable to provide the user with information to aid such circumstances. For instance, an apparatus may provide visual references to the user that may indicate details about the video information, such as the relative position of an individual frame with respect to other frames within the video information.

The examples of FIGS. 4A-4D illustrate video information 400. It should be understood that video information 400 generally illustrates display of a video. The video may be similar as described in regards to FIGS. 3A-3B. Video information 400 comprises video timeline 410, and video timeline indicator 412. Video timeline 410 is representative of the overall length in time of the video illustrated by video information 400. Video timeline indicator 412 is representative of the current playback position with respect to video timeline 410 of the video in illustrated by video information 400.

In many circumstances, it may be desirable for an apparatus to receive information indicative of an input associated with video information. For example, an input associated with video information may initiate the apparatus to display the video information, share the video information, edit the video information, and/or the like. In at least one example embodiment, the apparatus receives information indicative of a scrub input associated with video information, such that the scrub input comprises a movement portion and a termination portion. The scrub input may be similar as described regarding FIGS. 3A-3B.

Figure 4A:
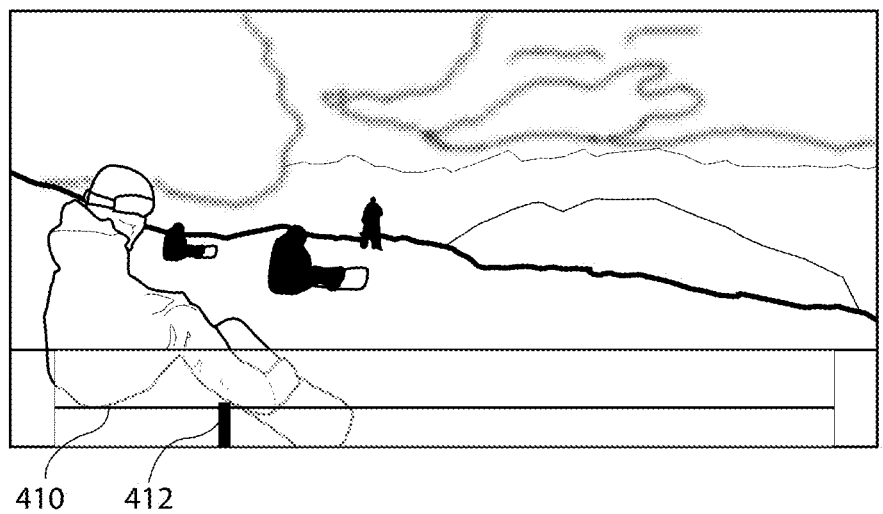
FIGS. 4A-4D are diagrams illustrating determination of share video information according to at least one example embodiment.
Figure 4B:
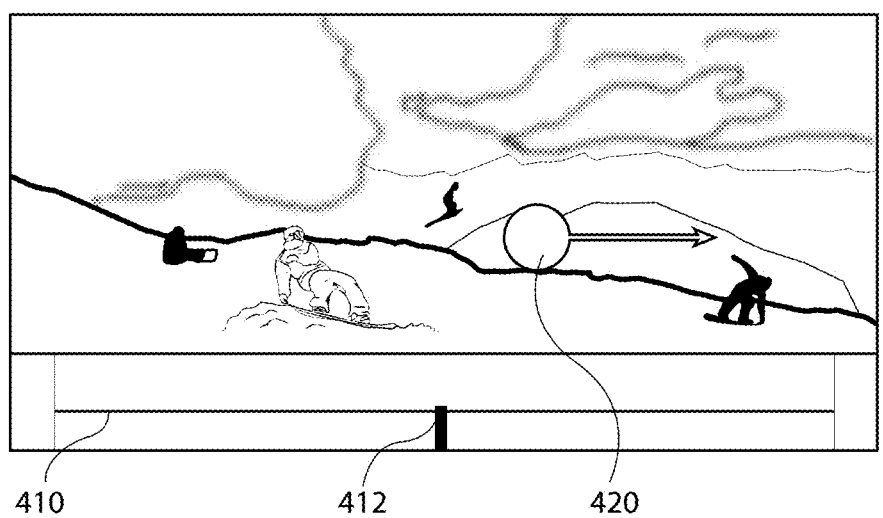

The example of FIG. 4B illustrates information indicative of a scrub input 420. Information indicative of a scrub input 420 is associated with a scrub input similar as previously described. The example illustrated by information indicative of a scrub input 420 is indicative of a left to right scrub input, but in other circumstances information indicative of a scrub input 420 may be indicative of other scrub inputs, such as a right to left scrub input, an up to down scrub input, and/or the like. The scene illustrated in FIG. 4B illustrates a different point in time of the video represented by video information 400 than illustrated in FIGS. 4A, 4C and 4D. The difference between the scene illustrated in FIGS. 4A and 4B is representative of different frames.

In many circumstances, it may be desirable for an apparatus to cause display of a progression of frames of video information. For example, displaying a progression of frames may assist a user in locating a particular frame of video information, provide a quick overview of the content of a video, and/or the like. A progression of frames may comprise a series of frames arranged in a particular order. For example, the order could be a chronological order. In at least one example embodiment, the apparatus causes display of a progression of frames of the video information in correspondence with the movement portion of the scrub input. For example, in circumstances where the movement portion of the scrub input corresponds with a left to right motion, the progression of frames may be displayed in a chronological order. In circumstances where the movement portion of the scrub input corresponds with a right to left motion, the progression of frames may be displayed in a reverse-chronological order. In at least one example embodiment, the scrub input is associated with the video information by way of at least a portion of the scrub input corresponding with a video timeline indicator of the video information. For example, the scrub input could be associated with information video timeline indicator 412 of FIGS. 4A-4D such that video timeline indicator 412 changes position with respect to video timeline 410. For instance, a left to right scrub input, such as that indicated by information indicative of a scrub input 420 may cause video timeline indicator 412 to move to a position further to the right with respect to video timeline 410. In at least one example embodiment, the scrub input is associated with the video information by way of at least a portion of the scrub input corresponding with the progression of frames of the video information. For example, a scrub input may cause display of a progression of in a particular order with respect to a video timeline. For instance, a left to right scrub input may advance display of a progression of frames as depicted by the different frames of FIGS. 4A and 4B such that the display progresses from the scene illustrated in FIG. 4A to the scene illustrated in FIG. 4B. In another example, a right to left scrub input may reverse the advance of display of a progression of frames, such that an earlier frame is displayed.

In some circumstances, it may be desirable for the apparatus to determine a speed of the movement portion of a scrub input. For example, the speed of the movement portion may be used by the apparatus to determine a rate to display a progression of frames. For instance, the speed of the movement portion of a scrub input may be the rate at which information indicative of the movement portion of the scrub input changes. For example, a user dragging a finger across a touch display may be indicative of the movement portion of a scrub input. The rate of change in position of the user's finger may be measured. This measured rate of change of finger position may indicate a speed of the movement portion of a scrub input. In at least one example embodiment, the movement portion of the scrub input has a speed. In at least one example embodiment, the apparatus determines the speed of the movement portion of the scrub input.

In many instances, it may be desirable for an apparatus to perform frame skipping. Frame skipping may refer to the display of a contiguous progression of non-adjacent frames of video information. For example, by performing frame skipping, the apparatus may allow for rapid navigation to a particular portion of video information, a fast forward playback effect, and/or the like. Frame skipping may be based, at least in part, on the speed of the scrub input. For example, the apparatus may skip frames when rendering video information in relation to a high speed scrub input, and may avoid skipping frames when rendering video information in relation to a low speed scrub input.

In many instances, it may be desirable to utilize a speed threshold to differentiate various speeds of the movement portions of various scrub inputs. For example, in circumstances where the apparatus determines that the speed of a scrub input is below the speed threshold the apparatus may perform an action. In such an example, in circumstances where the apparatus determines the speed of the scrub input is greater than the speed threshold, the apparatus may perform a different action. It may be desirable for a speed threshold to be a frame skipping speed threshold. For example, a user may enter a scrub input at a particular rate to instantiate frame skipping. In at least one example embodiment, a frame skipping speed threshold is a speed of a scrub input that signifies a difference between a range of speeds associated with a contiguous progression of adjacent frames of the video information, and a different range of speeds associated with a contiguous progression of non-adjacent frames of the video information.

In at least one example embodiment, a speed of a scrub input that is less than the frame skipping speed threshold is associated with a contiguous progression of adjacent frames of video information. In at least one example embodiment, the apparatus determines that the speed of the movement portion of the scrub input is less than a frame skipping speed threshold. In such circumstances the apparatus may cause display of a contiguous progression of adjacent frames of the video information based, at least in part, on the determination that the speed of the movement portion of the scrub input is less than the frame skipping speed threshold. For example, the apparatus may receive a scrub input that is less than the frame skipping threshold and display a contiguous progression of adjacent frames, such that a frame-by-frame playback effect occurs based, at least in part, on the movement of the scrub input being less than the frame skipping threshold.

In at least one example embodiment, a speed of a scrub input that is greater than the frame skipping speed threshold is associated with a contiguous progression of non-adjacent frames of video information. In at least one example embodiment, the apparatus determines that the speed of the movement portion of the scrub input is greater than a frame skipping speed threshold. In such circumstances, the apparatus may cause display of a contiguous progression of non-adjacent frames of the video information based, at least in part, on the determination that the speed of the movement portion of the scrub input is greater than the frame skipping speed threshold. For example, the apparatus may receive a scrub input greater than the frame skipping threshold and display a contiguous progression of non-adjacent frames, such that a frame skipping effect occurs based, at least in part, on the movement of the scrub input being greater than the frame skipping threshold.

Often when viewing a video on an electronic apparatus, it may be desirable to send video information to a separate apparatus. For example, a user may wish to share a video with a server so the video can be viewed on a social networking site, share the video on a remote display so it can be viewed by another person, send the video to a separate apparatus so that a user of the separate apparatus may view the video, and/or the like. In such circumstances, the user may designate a video, and/or a video segment, to be sent to a separate apparatus.

In at least one example embodiment, video information that a user desires to share with a separate apparatus is referred to as share video information. In at least one example embodiment, share video information comprises at least part of the video information that is designated to be sent to the separate apparatus. For example, the share video information may be the entirety of a video, an image that represents a frame of the video, a video segment, and/or the like. To facilitate the sending of video information to a separate apparatus, it may be desirable for the apparatus to receive information indicative of a share input. A share input may be an input that instructs the apparatus to send video information to a separate apparatus. For example, the share input may be an input that indicates selection of a menu item that corresponds with sharing video information. In another example, the share input may be a gesture input that corresponds with sharing video information. The sending may be similar as described in regards to FIG. 2. In at least one example embodiment, sending the share video information to the separate apparatus is based, at least in part, on the share input.

To facilitate ease of sharing of video information, it may be desirable for the apparatus to determine share video information in a simple and intuitive manner. For example, it may be desirable for the apparatus to receive information indicative of an input to determine the share video information. For instance, the apparatus may apparatus determine the share video information to be the entirety of a video, an image that represents a frame, or a video segment based, at least in part, on information indicative of a scrub input. For example, the apparatus may determine that the speed of the scrub input indicates the manner of video information that the user desires to share. For example, a slow scrub input, that causes a contiguous progression of adjacent frames, may indicate that a user is deliberately searching for a particular frame. In another example, a fast scrub input that causes a contiguous progression of non-adjacent frames may indicate that the user is skimming through the video to evaluate a particular region and/or the entirety of the video.

In at least one example embodiment, the apparatus determines share video information that comprises at least part of the video information based, at least in part, on a speed of the movement portion of a scrub input. For example, when a speed of movement of the movement portion of a scrub input is less than a frame skipping threshold, the apparatus may determine the share video information to be an image that represents a frame that is displayed during the termination portion of the scrub input. In at least one example embodiment, the apparatus determines the share video information to be an image that represents a frame that is displayed during the termination portion of the scrub input based, at least in part, on the determination that the speed of the movement portion of the scrub input is less than the frame skipping speed threshold.

In another example, when a speed of movement of the movement portion is greater than a frame skipping threshold, the apparatus may determine the share video information to comprise an entirety of the video information. In at least one example embodiment, the apparatus determines the share video information to comprise an entirety of the video information based, at least in part, on the determination that the speed of the movement portion of the scrub input is greater than the frame skipping speed threshold.

When determining share video information, it may be desirable to associate an image with the share video information. For example, an associated image may be a video thumbnail that represents the share video information. A video thumbnail may be a reduced size image that helps a user to recognize the video information. For example, the video thumbnail may be representative of a frame that is displayed during the termination portion of a scrub input. In at least one example embodiment, the apparatus may determine the video thumbnail based, at least in part, on a scrub input. For example, a frame that is displayed during the termination portion of a scrub input may be described as a displayed frame. For instance, a displayed frame might by the image displayed in the example of FIG. 4B. In at least one example embodiment, the apparatus identifies the displayed frame and determines the video thumbnail based, at least in part, on the displayed frame. In at least on example embodiment, the apparatus determines an image that represents the displayed frame, wherein determining the share video information comprises associating the image with the share video information such that the image is a video thumbnail of the share video information. For example, the apparatus may associate the image of FIG. 4B with the share video information such that the image of FIG. 4B is a video thumbnail of the share video information.

In at least one example embodiment, the association of the image with the share video information comprises causation of metadata of the shared video information to indicate the image as the video thumbnail of the shared video information. For example, the association of the image of FIG. 4B with the share video information may cause metadata of the share video to indicated the image of FIG. 4B as the video thumbnail of the shared video information.

In at least one example embodiment, determining the share video information comprises designation of the displayed frame as a first observed frame of the share video information. A first observed frame may be the first frame of the share video information that is displayed upon playback of the share video information. In this manner, the apparatus may designate a frame other than a start frame to be a first observed frame of the share video information. For example, the apparatus may designate frame 304 of FIG. 3A to be a first observed frame, even though frame 304 is a non-start frame of video 300. In this example, frame 304 may be the first frame that is rendered upon playback of video 300.

Figure 4C:
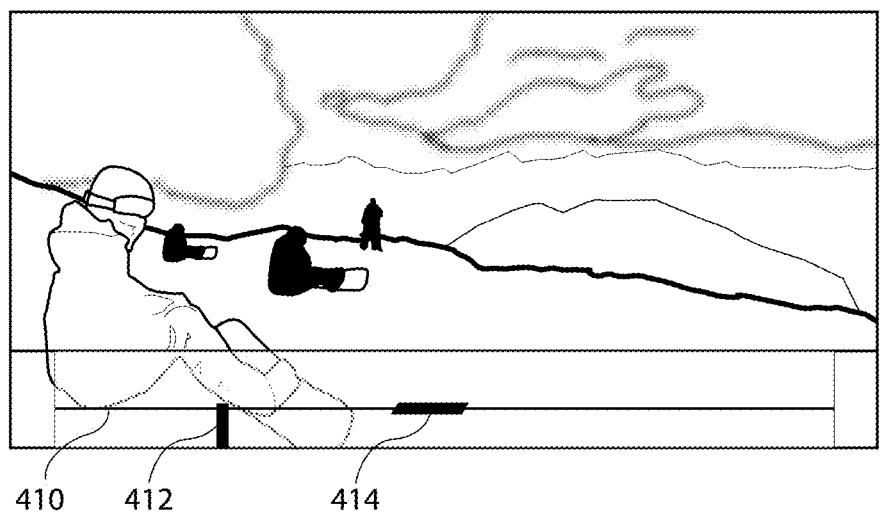

The example of FIG. 4C illustrates video information 400 as previously described. Additionally FIG. 4C illustrates a peak motion indicator 414. Peak motion indicator 414 is displayed at a position on video timeline 410 relative to the position of video information corresponding with peak motion of the video information in relation to video timeline 410. For example, the apparatus may have previously analyzed the video information by way of peak motion detection to determine the position of peak motion indicator 414. In this manner, the user may understand that the portion of the video information corresponding with peak motion indicator 414 is a portion of the video information comprised by peak motion of the video information. This may assist the user in designating share video information. For example, if the user desires to share the portion of the video information corresponds with peak motion of the video information, the user may designate at least the portion of the video information indicated by peak motion indicator 414 as share video information.

Many circumstances may arise where it may be useful for a user to understand which video information is share video information. For instance, a user may wish to know the share video information that has been determined before instructing an apparatus to send the video information to a separate apparatus. For example, the apparatus may have charges associated with transmission of the share video information, and the user wants to prevent accidentally transferring a large amount of data. In at least one example embodiment, the apparatus causes display of a share video information indicator. A share video information indicator may be a visual cue that indicates the part of the video information that is comprised by the share video information. In at least one example embodiment, the share video information indicator is an entirety share video information indicator. An entirety share video information indicator may signify that the share video information corresponds with an entirety of the video information. In at least one example embodiment, the share video information indicator is a frame share video information indicator. A frame share video information indicator may signify a frame of the video information that corresponds with the share video information, such that the share video information is an image that represents the frame of the video information. In at least one example embodiment the apparatus causes display of a video thumbnail indicator. A video thumbnail indicator may signify a frame of the video information that corresponds with a video thumbnail of the share video information. In some circumstances, a video thumbnail indicator may also indicate other information. For example, in some circumstances, video timeline indicator 412 may also be a video thumbnail indicator. In circumstances such as these, video timeline indicator 412 may signify a frame of the video information that corresponds with a video thumbnail of the share video information as well as the current playback position with respect to video timeline 410. In this manner, the user may understand that the video thumbnail of the corresponding share video information is a representative image of a frame that corresponds with the position of video timeline indicator 412 on video timeline 410.

When sharing a video information, it may be desirable to share only a portion of the video information. For example, the video may be long, and the user may only be interested in sharing a short clip from the video. In such circumstances, it may be desirable to share a video segment similar as described regarding FIGS. 3A-3B. The user may alert the apparatus that he wishes to share a video segment by performing a trim operation selection input. In this manner, the apparatus may receive information indicative of a trim operation input. A trim operation input may be an input that instructs the apparatus to perform a trim operation. A trim operation may be an operation that generates a video segment from a video. A trim operation input may be any input, such as a touch input, a menu selection, a button click, and/or the like.

Figure 4D:
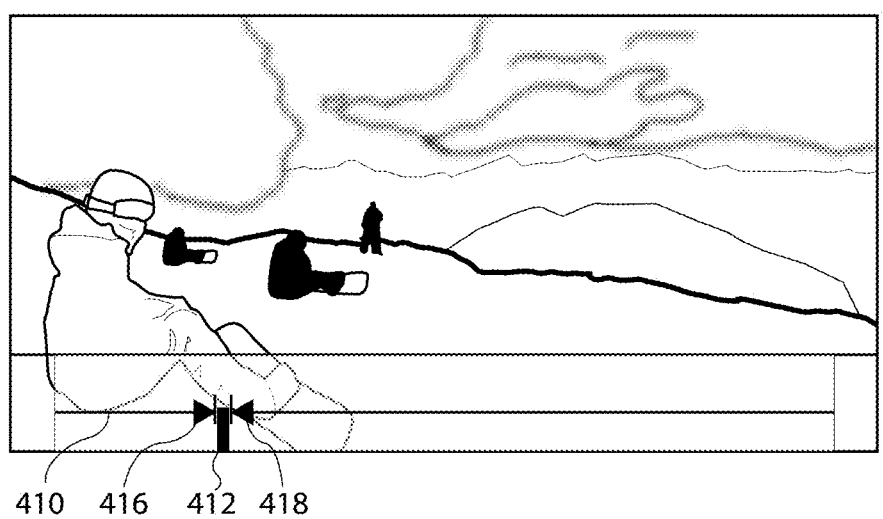

The example of FIG. 4D illustrates video information 400 as previously described. Additionally FIG. 4D illustrates a video trim start indicator 416 and a video trim end indicator 418. Video trim start indicator 416 is displayed at a position on video timeline 410 relative to the position of a frame of video information. Video trim start indicator 416 may be a visual cue that may inform a user of trimming of the video information to a portion of the video information that begins after the frame corresponding with the position of video trim start indicator 416. Video trim end indicator 418 is displayed at a position on video timeline 410 relative to the position of a different frame of video information occurring at a later time on video timeline 410 with respect to video trim start indicator 416. Video trim end indicator 418 may be a visual cue that may inform a user of trimming of the video information to a portion of the video information that ends before the frame corresponding with the position of video trim end indicator 418. In this manner, video trim start indicator 416 and a video trim end indicator 418 may designate the portion of the video information represented by the portion of video timeline 410 that is bounded between video trim start indicator 416 and a video trim end indicator 418 as share video information. In this respect, video trim start indicator 416 and a video trim end indicator 418 may be described as share video information indicators.

In some circumstances, the indicators of a video timeline may be indicative of share video information. For example, the user may be able to understand which video information is share video information by way of indicators of the video timeline. In the example of FIG. 4C, it can be seen that there is an absence of a video trim indicator. In this manner, video timeline 410 being absent a video trim indicator may indicate an entirety of the video information indicator. In this manner, upon determination of the share video information, the continued position of the absence of the trim indicators may serve as a share video indicator. For example, such absence of trim indicators may serve as an entirety share video information indicator.

In some circumstances, a video trim start indicator and a video trim end indicator may bound a single frame of video information. It can be seen in FIG. 4D that video trim start indicator 416 and video trim end indicator 418 bound approximately one frame of video information corresponding with the position of video timeline indicator 412 on video timeline 410. In circumstances where a video trim start indicator and a video trim end indicator bound a single frame, the combination of a video trim start indicator and a video trim end indicator may serve as a frame share video information indicator. A frame share video information indicator may be a visual cue that may alert a user that the apparatus has determined share video information is a frame. In this manner, upon determination of the share video information, the trim indicators and the video timeline indicator may serve as a share video indicator. In at least one example embodiment, a frame share video information indicator comprises a video trim start indicator and a video trim end indicator.

A trim operation input may be a first input in a series of inputs related to a trim operation. For example, the apparatus may receive information indicative of a trim operation input that instructs the apparatus that a trim operation need to be performed, while a subsequent input may designate how the apparatus should perform the trim operation. In such an example, the trim operation input may be a trim operation selection input. In at least one example embodiment, a trim operation selection input signifies that a subsequent scrub input indicates at least one of a start frame or an end frame of the video segment. As described previously, in at least one example embodiment, the apparatus determines that the speed of the movement portion of the scrub input is greater than a frame skipping speed threshold. As described previously, in at least one example embodiment, the apparatus identifies a displayed frame as a frame that is displayed during the termination portion of the scrub input. In this manner, the apparatus may determine a video segment that is a portion of the video information that corresponds with a portion of the video information prior to the displayed frame, a portion of the video information subsequent to the displayed frame, and/or the like. The apparatus may determine such a video segment based, at least in part, on the determination that the movement portion of the scrub input is greater than the frame skipping speed threshold and the trim operation selection input. For example, if the apparatus determines that the portion of the video information corresponds with a portion of the video information prior to the displayed frame, the apparatus may send a video segment to a separate apparatus in which the displayed frame is an end frame. In another example, if the apparatus determines that the portion of the video information corresponds with a portion of the video information subsequent to the displayed frame, the apparatus may send a video segment to a separate apparatus in which the displayed frame is a start frame.

When the share video information is a video segment, it may be desirable to indicate this to the user. For example, the user may not be aware the share video information is a video segment, and the user may have desired for the share video information to be the entirety of the video information or a frame rather than a video segment. In at least one example embodiment, the share video information is a video segment and the share video information indicator comprises at least one of a segment start indicator or a segment end indicator. A segment start indicator may signify a frame of the video information that corresponds with a start frame of the video segment. A segment end indicator may signify a frame of the video information that corresponds with an end frame of the video segment.

Figure 5:
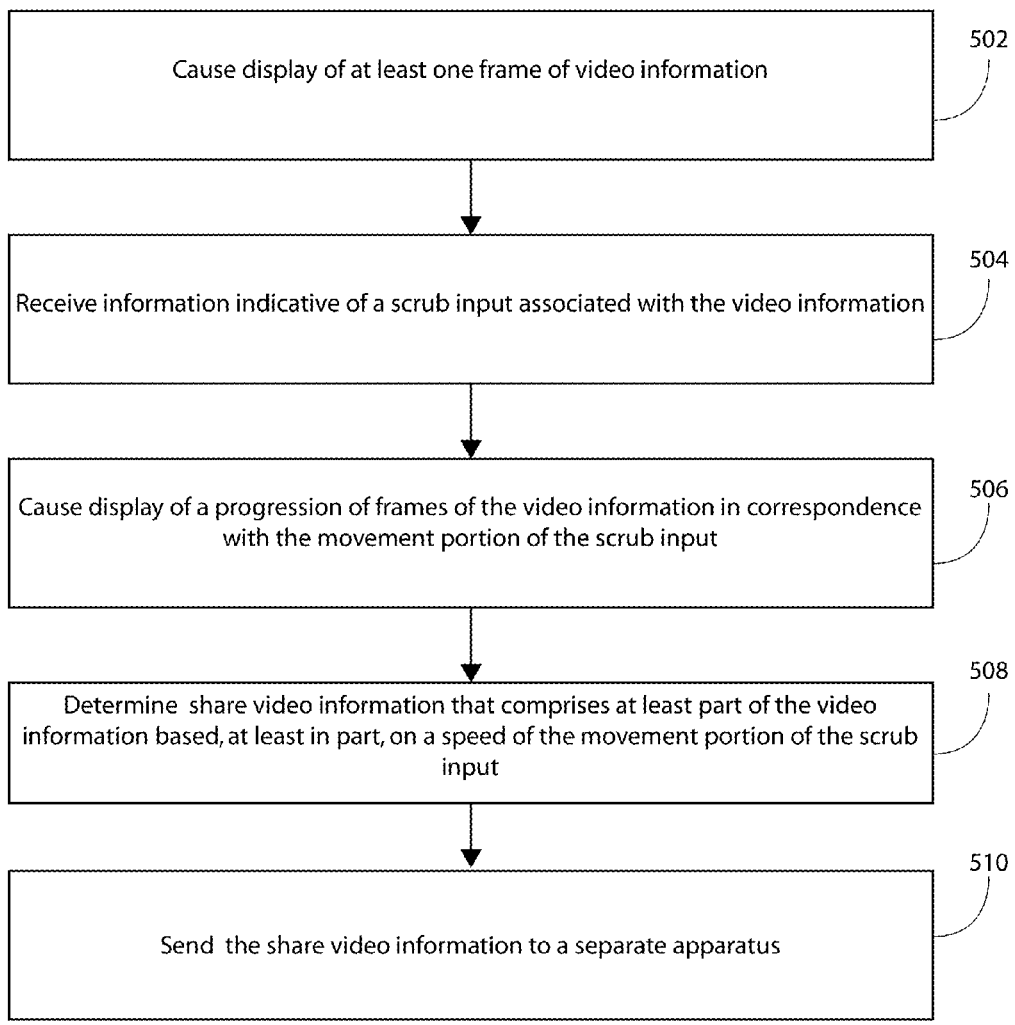
FIG. 5 is a flow diagram illustrating activities associated with sharing video information with a separate apparatus according to at least one example embodiment.

FIG. 5 is a flow diagram illustrating activities associated with sharing video information with a separate apparatus according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus causes display of at least one frame of video information. The frame and the video information may be similar as described regarding FIGS. 2A-2B and FIGS. 3A-3B.

At block 504, the apparatus receives information indicative of a scrub input associated with the video information. The receipt and the scrub input may be similar as described regarding FIGS. 3A-3B and FIGS. 4A-4D.

At block 506, the apparatus causes display of a progression of frames of the video information in correspondence with the movement portion of the scrub input. The progression of frames and the correspondence may be similar as described regarding FIGS. 4A-4D.

At block 508, the apparatus determines share video information that comprises at least part of the video information based, at least in part, on a speed of the movement portion of the scrub input. The determination, the share video information, and the speed may be similar as described regarding FIGS. 4A-4D.

At block 510, the apparatus sends the share video information to a separate apparatus. The sending and the separate apparatus may be similar as described regarding FIG. 2.

Figure 6:
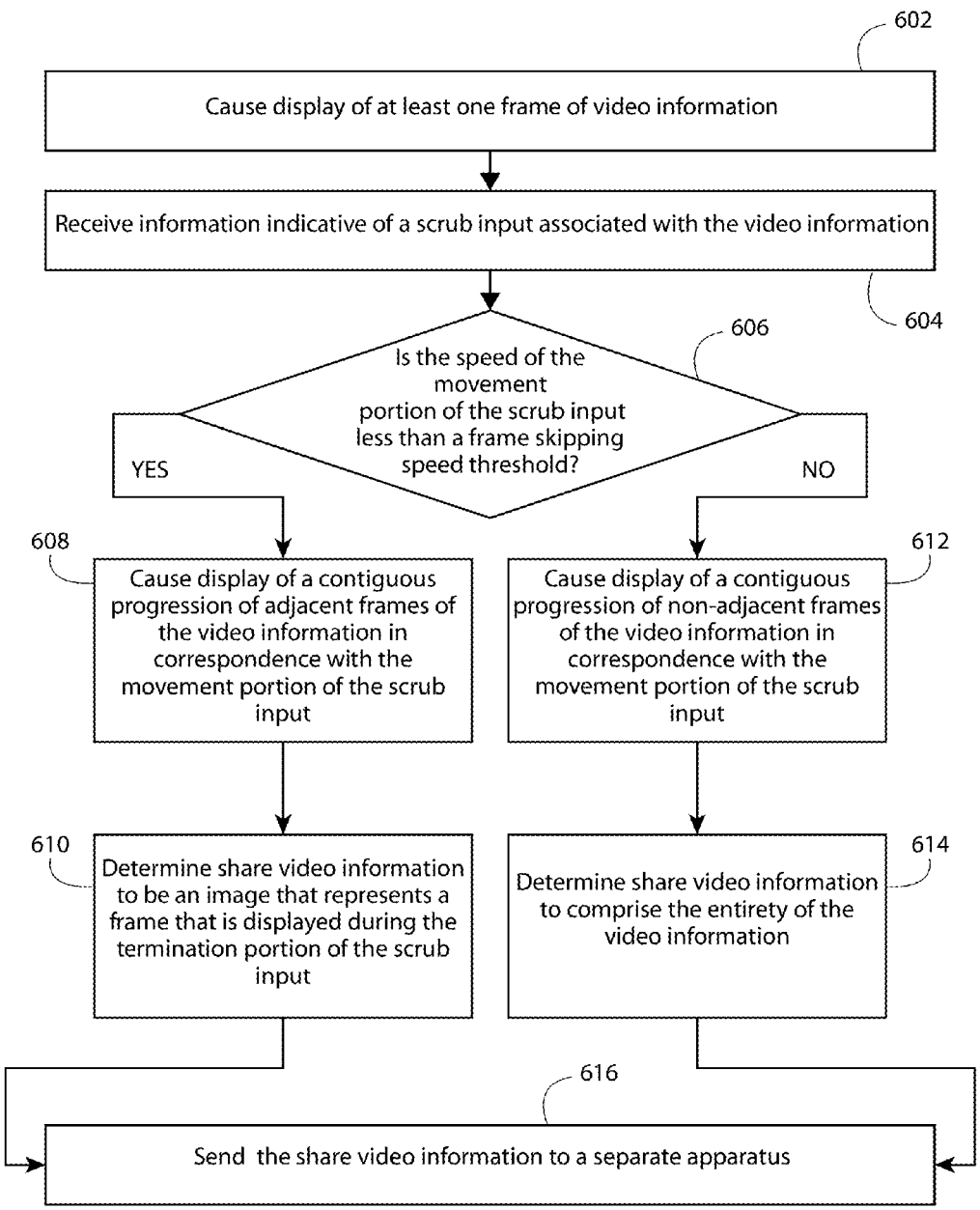
FIG. 6 is a flow diagram illustrating activities associated with sharing video information with a separate apparatus according to at least one example embodiment.

FIG. 6 is a flow diagram illustrating activities associated with sharing video information with a separate apparatus according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As previously described, in some circumstances, it may be desirable to determine a speed of a movement portion of a scrub input. In such circumstances, it may be desirable to determine the share video information based, at least in part, on the speed of the movement portion of the scrub input.

At block 602, the apparatus causes display of at least one frame of video information, similarly as described regarding block 502 of FIG. 5. At block 604, the apparatus receives information indicative of a scrub input associated with the video information, similarly as described regarding block 504 of FIG. 5.

At block 606, the apparatus determines whether the speed of the movement portion of the scrub input is less than a frame skipping speed threshold. The determination, the speed, and the frame skipping speed threshold may be similar as described regarding FIGS. 4A-4D. If the apparatus determines that the speed of the movement portion of the scrub input is less than the frame skipping speed threshold, flow proceeds to block 608. If the apparatus determines that the speed of the movement portion of the scrub input is greater than the frame skipping speed threshold, flow proceeds to block 612.

At block 608, the apparatus causes display of a contiguous progression of adjacent frames of the video information in correspondence with the movement portion of the scrub input. The contiguous progression of adjacent frames and the correspondence may be similar as described regarding FIGS. 4A-4D. In this manner, the apparatus may cause display of the contiguous progression of adjacent frames of the video information based, at least in part, on the determination that the speed of the movement portion of the scrub input is less than the frame skipping speed threshold.

At block 610, the apparatus determines the share video information to be an image that represents a frame that is displayed during the termination portion of the scrub input. The determination and the image may be similar as described FIGS. 4A-4D. In this manner, the apparatus may determine the share video information to be an image that represents a frame that is displayed during the termination portion of the scrub input based, at least in part, on the determination that the speed of the movement portion of the scrub input is less than the frame skipping speed threshold.

At block 612, the apparatus causes display of a contiguous progression of non-adjacent frames of the video information in correspondence with the movement portion of the scrub input. The contiguous progression of non-adjacent frames and the correspondence may be similar as described regarding FIGS. 4A-4D. In this manner, the apparatus may cause display of the contiguous progression of non-adjacent frames based, at least in part, on the determination that the speed of the movement portion of the scrub input is greater than the frame skipping speed threshold.

At block 614, the apparatus determines the share video information to comprise an entirety of the video information. In this manner, the apparatus may determine the share video information to comprise an entirety of the video information based, at least in part, on the determination that the speed of the movement portion of the scrub input is greater than the frame skipping speed threshold. At block 616, the apparatus sends the share video information to a separate apparatus, similarly as described regarding block 510 of FIG. 5.

Figure 7:
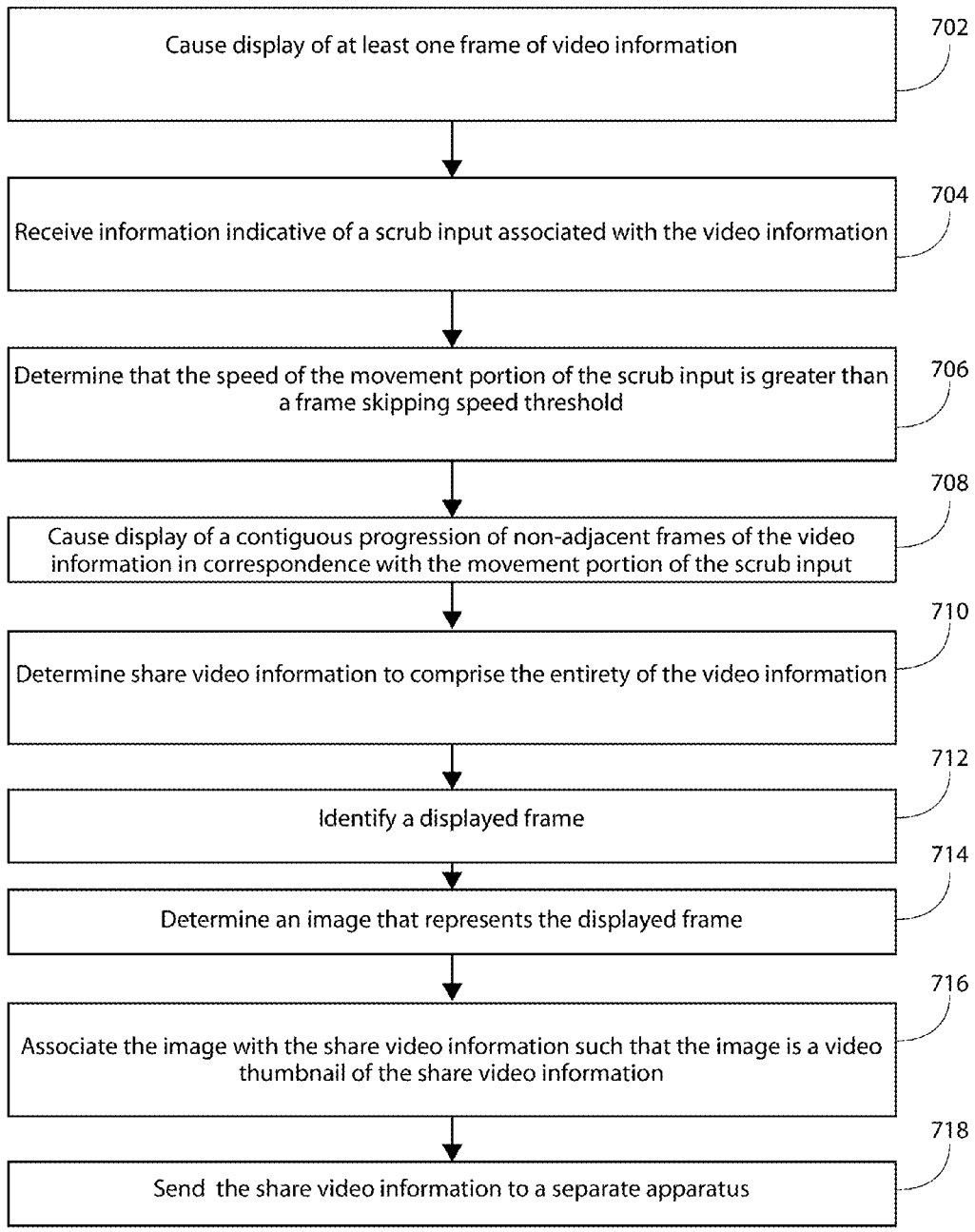
FIG. 7 is a flow diagram illustrating activities associated with sharing video information with a separate apparatus according to at least one example embodiment.

FIG. 7 is a flow diagram illustrating activities associated with sharing video information with a separate apparatus according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, in some circumstances, it may be desirable to determine a video thumbnail to associate with the share video information.

At block 702, the apparatus causes display of at least one frame of video information, similarly as described regarding block 502 of FIG. 5. At block 704, the apparatus receives information indicative of a scrub input associated with the video information, similarly as described regarding block 504 of FIG. 5.

At block 706, the apparatus determines that the speed of the movement portion of the scrub input is greater than a frame skipping speed threshold. The determination, the speed, and the frame skipping speed threshold may be similar as described regarding FIGS. 4A-4D.

At block 708, the apparatus causes display of a contiguous progression of non-adjacent frames of the video information in correspondence with the movement portion of the scrub input. The contiguous progression of non-adjacent frames and the correspondence may be similar as described regarding FIGS. 4A-4D.

At block 710, the apparatus determines share video information to comprise the entirety of the video information. The determination and the share video information may be similar as described regarding FIGS. 4A-4D.

At block 712, the apparatus identifies a displayed frame. The identification and the displayed frame may be similar as described regarding FIGS. 3A-3B and FIGS. 4A-4D.

At block 714, the apparatus determines an image that represents the displayed frame. The determination and the image may be similar as described regarding FIGS. 3A-3B and FIGS. 4A-4D.

At block 716, the apparatus associates the image with the share video information such that the image is a video thumbnail of the share video information. The association and the video thumbnail may be similar as described regarding FIGS. 4A-4D. At block 718, the apparatus sends the share video information to a separate apparatus, similarly as described regarding block 510 of FIG. 5.

Figure 8:
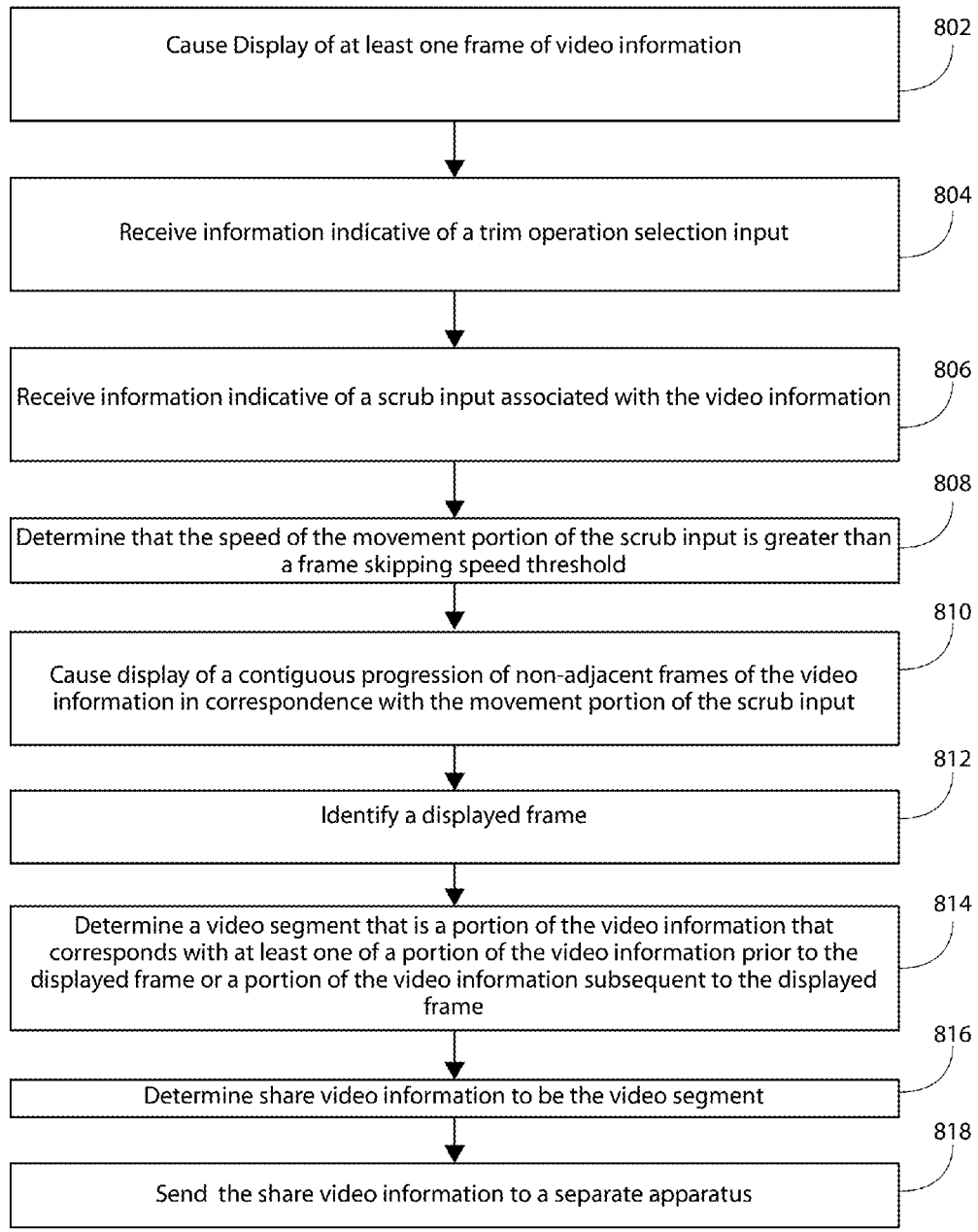
FIG. 8 is a flow diagram illustrating activities associated with sharing video information with a separate apparatus according to at least one example embodiment.

FIG. 8 is a flow diagram illustrating activities associated with sharing video information with a separate apparatus according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances, it may be desirable for the share video information to be a video segment.

At block 802, the apparatus causes display of at least one frame of video information, similarly as described regarding block 502 of FIG. 5. At block 804, the apparatus receives information indicative of a trim operation selection input. The receipt and the trim operation selection input may be similar as described regarding FIGS. 4A-4D.

At block 806, the apparatus receives information indicative of a scrub input associated with the video information, similarly as described regarding block 504 of FIG. 5. At block 808, the apparatus determines that the speed of the movement portion of the scrub input is greater than a frame skipping speed threshold, similarly as described regarding block 706 of FIG. 7. At block 810, the apparatus causes display of a contiguous progression of non-adjacent frames of the video information in correspondence with the movement portion of the scrub input, similarly as described regarding block 708 of FIG. 7. At block 812, the apparatus identifies a displayed frame, similarly as described regarding block 712 of FIG. 7.

At block 814, the apparatus determines a video segment that is a portion of the video information that corresponds with at least one of a portion of the video information prior to the displayed frame or a portion of the video information subsequent to the displayed frame. The determination, the video segment, and the video information may be similar as described regarding FIGS. 3A-3B and FIGS. 4A-4D.

At block 816, the apparatus determining the share video information to be the video segment. The determination may be similar as described regarding FIGS. 4A-4D. At block 818, the apparatus sends the share video information to a separate apparatus, similarly as described regarding block 510 of FIG. 5.

Figure 9:
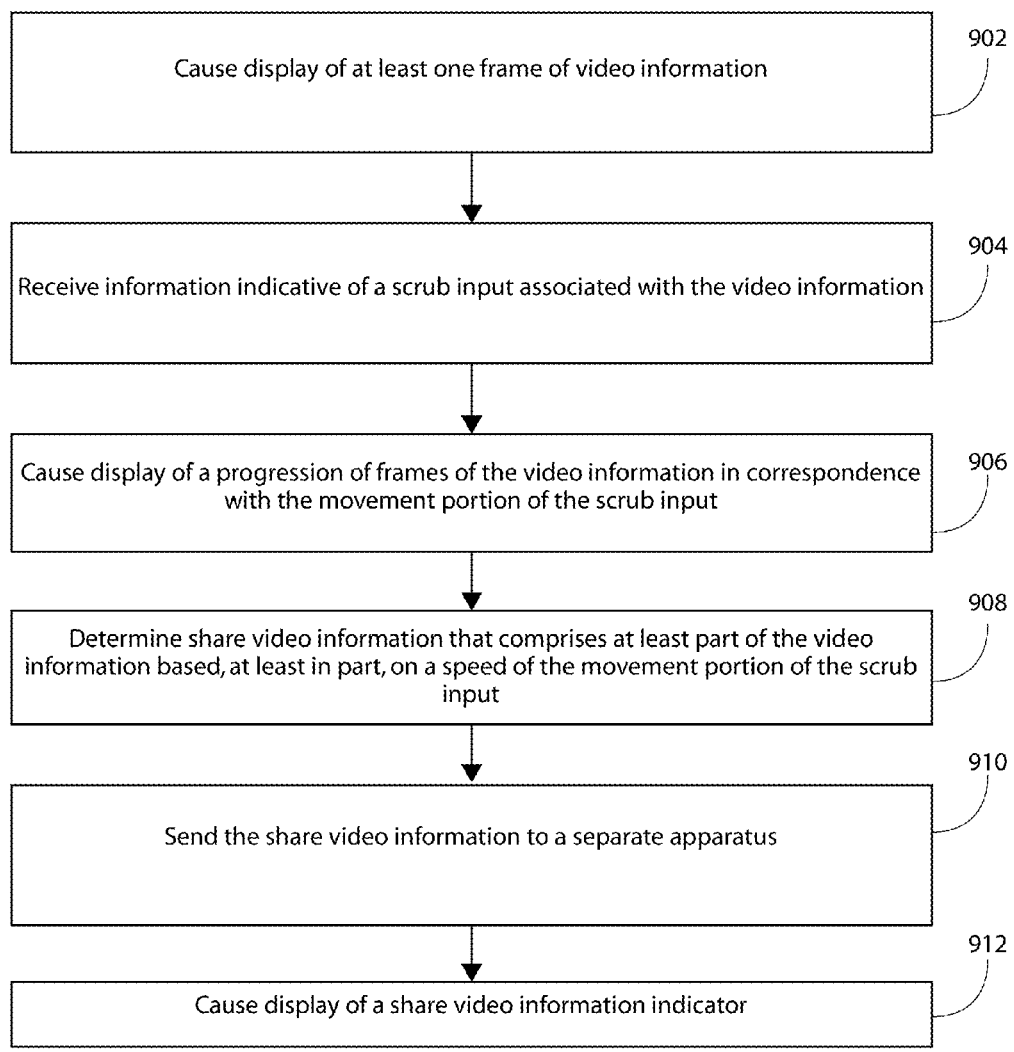
FIG. 9 is a flow diagram illustrating activities associated with sharing video information with a separate apparatus according to at least one example embodiment.

FIG. 9 is a flow diagram illustrating activities associated with sharing video information with a separate apparatus according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, it may be desirable to cause display of a share video information indicator.

At block 902, the apparatus causes display of at least one frame of video information, similarly as described regarding block 502 of FIG. 5. At block 904, the apparatus receives information indicative of a scrub input associated with the video information, similarly as described regarding block 504 of FIG. 5. At block 906, the apparatus causes display of a progression of frames of the video information in correspondence with the movement portion of the scrub input, similarly as described regarding block 506 of FIG. 5. At block 908, the apparatus determines share video information that comprises at least part of the video information based, at least in part, on a speed of the movement portion of the scrub input, similarly as described regarding block 508 of FIG. 5. At block 910, the apparatus sends the share video information to a separate apparatus, similarly as described regarding block 510 of FIG. 5.

At block 912, the apparatus causes display of a share video information indicator. The share video information indicator may be similar as described regarding FIGS. 3A-3B and FIGS. 4A-4D.

Embodiments of the invention may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 708 of FIG. 7 may be performed after block 710 of FIG. 7. Furthermore, if desired, one or more of the above-described functions may be optional or may be combined. For example, block 708 of FIG. 7 may be optional and/or combined with block 710 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the at least one memory and the computer program code configured to, working with the at least one processor, cause the apparatus to perform at least the following:
   providing at least one frame of video information at a first device;
   receiving information indicative of a scrub input associated with the video information, wherein the scrub input comprises a movement portion and a termination portion;
   comparing a speed of the movement portion of the scrub input to a frame skipping speed threshold;
   selecting a first progression of frames of the video information to be sent to a second device when the speed of the movement portion of the scrub input is less than the frame skipping speed threshold;
   selecting a second progression of frames of the video information to be sent to the second device when the speed of the movement portion of the scrub input is more than the frame skipping speed threshold;
   determining share video information that comprises at least part of the video information as the first progression of frames or the second progression of frames selected based, at least in part, on the speed of the movement portion of the scrub input; and
   sending of the share video information to the second device.

2. The apparatus of claim 1, wherein the first progression of the frames of the video information is a contiguous progression of adjacent frames of the video information based, at least in part, on the speed of the movement portion of the scrub input being less than the frame skipping speed threshold, and wherein determination of the share video information comprises determining the share video information to be an image that represents a frame that is displayed during the termination portion of the scrub input based, at least in part, on the determination that the speed of the movement portion of the scrub input is less than the frame skipping speed threshold.

3. The apparatus of claim 1, wherein the second progression of the frames of the video information is a contiguous progression of non-adjacent frames of the video information based, at least in part, on the speed of the movement portion of the scrub input is greater than the frame skipping speed threshold.

4. The apparatus of claim 3, wherein the at least one memory includes computer program code configured to, working with the at least one processor, cause the apparatus to perform identification of a displayed frame, the displayed frame being a frame that is displayed during the termination portion of the scrub input.

5. The apparatus of claim 4, wherein the at least one memory includes computer program code configured to, working with the at least one processor, cause the apparatus to perform determination of an image that represents the displayed frame, wherein determining the share video information comprises associating the image with the share video information such that the image is a video thumbnail of the share video information.

6. The apparatus of claim 4, wherein determining the share video information comprises designation of the displayed frame as a first observed frame of the share video information.

7. The apparatus of claim 1, wherein the at least one memory includes computer program code configured to, working with the at least one processor, cause the apparatus to perform:
   receipt of information indicative of a trim operation selection input;
   determination that the speed of the movement portion of the scrub input is greater than a frame skipping speed threshold;
   identification of a displayed frame, the displayed frame being a frame that is displayed during the termination portion of the scrub input; and
   determination of a video segment that is a portion of the video information that corresponds with at least one of a portion of the video information prior to the displayed frame or a portion of the video information subsequent to the displayed frame,
   wherein determining the share video information comprises determining the share video information to be the video segment based, at least in part, on the determination that the movement portion of the scrub input is greater than the frame skipping speed threshold and the trim operation selection input.

8. The apparatus of claim 1, wherein the at least one memory includes computer program code configured to, working with the at least one processor, cause the apparatus to perform receipt of information indicative of a share input, wherein the sending the share video information to the second device is based, at least in part, on the share input.

9. The apparatus of claim 1, further comprising:
a display configured to present the share video information that comprises at least part of the video information as the first progression of frames or the second progression of frames selected based, at least in part, on the speed of the movement portion of the scrub input.

10. A method comprising:
generating data for display of at least one frame of video information;
receiving information indicative of a scrub input associated with the video information, such that the scrub input comprises a movement portion and a termination portion;
displaying a progression of frames of the video information in correspondence with the movement portion of the scrub input;
comparing a speed of the movement portion of the scrub input to a threshold;
selecting a first portion of the video information as share video information when the speed of the movement portion of the scrub input is less than the threshold;
selecting a second portion of the video information as share video information when the speed of the movement portion of the scrub input is greater than the threshold; and
sending the share video information to a separate apparatus.

11. The method of claim 10, wherein the progression of the frames of the video information is a contiguous progression of adjacent frames of the video information based, at least in part, on the speed of the movement portion of the scrub input being less than the frame skipping speed threshold, and the share video information comprises an image that represents a frame that is displayed during the termination portion of the scrub input based, at least in part, on the determination that the speed of the movement portion of the scrub input is less than the frame skipping speed threshold.

12. The method of claim 10, wherein the progression of the frames of the video information is a contiguous progression of non-adjacent frames of the video information based, at least in part, on the speed of the movement portion of the scrub input being greater than the frame skipping speed threshold.

13. The method of claim 12, further comprising:
identifying a displayed frame, the displayed frame being a frame that is displayed during a termination portion of the scrub input.

14. The method of claim 13, further comprising:
determining an image that represents the displayed frame, wherein the share video information comprises associating the image with the share video information such that the image is a video thumbnail of the share video information.

15. The method of claim 13, wherein the share video information comprises designation of the displayed frame as a first observed frame of the share video information.

16. The method of claim 10, further comprising:
receiving information indicative of a trim operation selection input;
identifying a displayed frame, the displayed frame being a frame that is displayed during the termination portion of the scrub input; and
determining a video segment that is a portion of the video information that corresponds with at least one of a portion of the video information prior to the displayed frame or a portion of the video information subsequent to the displayed frame,
wherein the share video information is determined based on the trim operation selection input.

17. At least one non-transitory computer-readable medium encoded with instructions that, when executed by a processor, perform:
providing at least one frame of video information at a first device;
receiving information indicative of a scrub input associated with the video information, wherein the scrub input comprises a movement portion and a termination portion;
selecting a progression of frames of the video information to be sent to a second device when a speed of the movement portion of the scrub input is more than a frame skipping speed threshold;
selecting a single frame of the video information to be sent to the second device when the speed of the movement portion of the scrub input is less than the frame skipping speed threshold;
determining share video information that comprises at least part of the video information as the progression of frames or the single frame selected based, at least in part, on the speed of the movement portion of the scrub input; and
sending of the share video information to the second device.

18. The at least one non-transitory computer-readable medium of claim 17, wherein consecutive frames of the progression of frames shared with the second device includes adjacent frames from the video information.

19. The at least one non-transitory computer-readable medium of claim 17, wherein the single frame is included in contiguous frames of a second progression of frames shared with the second device that includes non-adjacent frames from the video information.

* * * * *